(12) United States Patent
Sagawa

(10) Patent No.: US 8,150,678 B2
(45) Date of Patent: Apr. 3, 2012

(54) SPOKEN DOCUMENT RETRIEVAL SYSTEM

(75) Inventor: Hirohiko Sagawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 803 days.

(21) Appl. No.: 12/275,519

(22) Filed: Nov. 21, 2008

(65) Prior Publication Data

US 2009/0132251 A1    May 21, 2009

(30) Foreign Application Priority Data

Nov. 21, 2007  (JP) ................. 2007-301891

(51) Int. Cl.
  *G06F 17/28* (2006.01)
(52) U.S. Cl. .............. 704/2; 704/10; 704/231; 704/235; 704/236; 704/251
(58) Field of Classification Search ................ 704/2, 10, 704/231, 235, 236, 251
  See application file for complete search history.

(56) References Cited

U.S. PATENT DOCUMENTS

| | | | |
|---|---|---|---|
| 6,611,803 B1 * | 8/2003 | Furuyama et al. | 704/254 |
| 6,990,448 B2 * | 1/2006 | Charlesworth et al. | 704/243 |
| 7,678,984 B1 * | 3/2010 | Lamere | 84/615 |

FOREIGN PATENT DOCUMENTS

| | | |
|---|---|---|
| JP | 2001-125903 | 5/2001 |
| JP | 2002-221984 | 8/2002 |
| JP | 2002-278579 | 9/2002 |
| JP | 2005-257954 | 9/2005 |

OTHER PUBLICATIONS

Edited by Chin-Hui. Lee, Frank K. Soong and Kuldip K. Paliwal, Kluwer, "Dynamic Programming" (pp. 385-411), Chapter 16, Academic Publishers (1996).
Edited by Chin-Hui. Lee, Frank K. Soong and Kuldip K. Paliwal, Kluwer, "HMM (Hidden Markov Model" (pp. 159-184) in "Automatic Speech & Speaker Recognition," Chapter 7, Academic Publishers (1996).

* cited by examiner

*Primary Examiner* — Qi Han
(74) *Attorney, Agent, or Firm* — Antonelli, Terry, Stout & Kraus, LLP.

(57) ABSTRACT

The present invention provides a spoken document retrieval system capable of high-speed and high-accuracy retrieval of where a user-specified keyword is uttered from spoken documents, even if the spoken documents are large in amount. Candidate periods are narrowed down in advance on the basis of a sequence of subwords generated from a keyword, and then the count values of the candidate periods containing the subwords are each calculated by adding up certain values. Through such simple process, the candidate periods are prioritized and then selected as retrieved results. In addition, the sequence of subwords generated from the keyword is complemented assuming that speech recognition errors occur, and then, candidate period generation and selection are performed on the basis of the complemented sequence of subwords.

13 Claims, 12 Drawing Sheets

FIG. 3
| 301 | 302 | 303 | 304 | 305 | 306 | |
|---|---|---|---|---|---|---|
| Subword name | Recorded count | Spoken document name 1 | Start position 1 | Spoken document name 2 | Start position 2 | ... |
FIG. 4
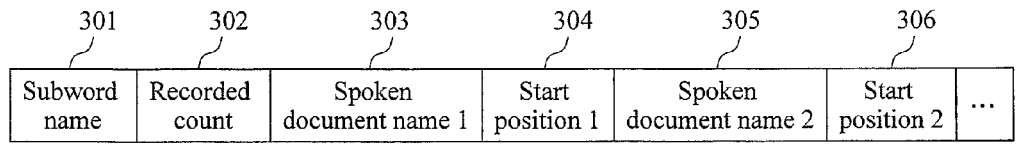
FIG. 5
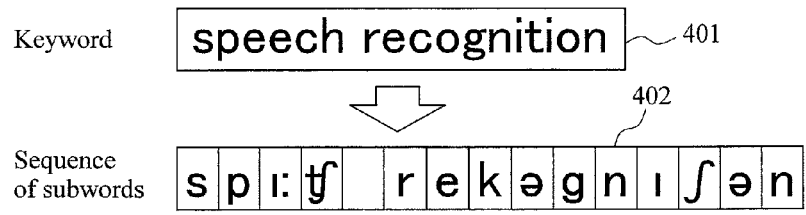

| Number of period | Spoken document name | Start position | End position | Count value | |
|---|---|---|---|---|---|
| 1 | D1 | t1 | t1' | 0 | — 706 |
| 2 | D1 | t2 | t2' | 0 | — 707 |
| 3 | D2 | t3 | t3' | 0 | — 708 |
| ... | ... | ... | ... | ... | |

| Number of period | Spoken document name | Start position | End position | Count value | |
|---|---|---|---|---|---|
| 1 | D1 | t1 | t1' | 0 | ~901 |
| 2 | D1 | t2 | t2' | 0 | ~902 |

  s

FIG. 9B

| Number of period | Spoken document name | Start position | End position | Count value | |
|---|---|---|---|---|---|
| 1 | D1 | t1 | t1' | 1 | ~903 |
| 2 | D1 | t2 | t2' | 1 | ~904 |

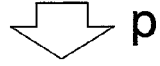  p

FIG. 9C

| Number of period | Spoken document name | Start position | End position | Count value | |
|---|---|---|---|---|---|
| 1 | D1 | t1 | t1' | 1 | ~905 |
| 2 | D1 | t2 | t2' | 2 | ~906 |

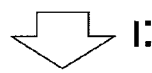  I:

FIG. 9D

| Number of period | Spoken document name | Start position | End position | Count value | |
|---|---|---|---|---|---|
| 1 | D1 | t1 | t1' | 1 | ~907 |
| 2 | D1 | t2 | t2' | 3 | ~908 |

  tʃ

FIG. 9E

| Number of period | Spoken document name | Start position | End position | Count value | |
|---|---|---|---|---|---|
| 1 | D1 | t1 | t1' | 2 | ~909 |
| 2 | D1 | t2 | t2' | 4 | ~910 |

FIG. 12

| s | p | iː | ʧ |   | r | e | k | ə | g | n | ɪ | ʃ | ə | n | ~1201 |
| z | k |    |   |   |   |   |   |   |   |   |   | ʧ | æ | k | ~1202 |
| — |   |    |   |   |   |   |   |   |   |   |   |   |   | — | ~1203 |

FIG. 13

| Number of period | Spoken document name | Start position | End position | Count value | |
|---|---|---|---|---|---|
| 1 | D1 | t1 | t1' | 0 | |
| 2 | D1 | t2 | t2' | 0 | |
| 3 | D2 | t3 | t3' | 0 | |
| 4 | D1 | t4 | t4' | 0 | ~1301 |
| 5 | D3 | t5 | t5' | 0 | ~1302 |
| 6 | D3 | t6 | t6' | 0 | ~1303 |
| ... | ... | ... | ... | ... | |

FIG. 16A

| Number of period | Spoken document name | Start position | End position | Count value | Start position of a subword | |
|---|---|---|---|---|---|---|
| 1 | D1 | t1 | t1' | 0 | - | ~1601 |
| 2 | D1 | t2 | t2' | 0 | - | ~1602 |

FIG. 16B

| Number of period | Spoken document name | Start position | End position | Count value | Start position of a subword | |
|---|---|---|---|---|---|---|
| 1 | D1 | t1 | t1' | 1 | t1 | ~1603 |
| 2 | D1 | t2 | t2' | 1 | t2 | ~1604 |

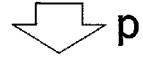

FIG. 16C

| Number of period | Spoken document name | Start position | End position | Count value | Start position of a subword | |
|---|---|---|---|---|---|---|
| 1 | D1 | t1 | t1' | 1 | t1 | ~1605 |
| 2 | D1 | t2 | t2' | 2 | t4 | ~1606 |

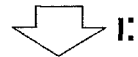

FIG. 16D

| Number of period | Spoken document name | Start position | End position | Count value | Start position of a subword | |
|---|---|---|---|---|---|---|
| 1 | D1 | t1 | t1' | 1 | t1 | ~1607 |
| 2 | D1 | t2 | t2' | 3 | t7 | ~1608 |

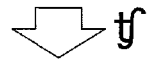

FIG. 16E

| Number of period | Spoken document name | Start position | End position | Count value | Start position of a subword | |
|---|---|---|---|---|---|---|
| 1 | D1 | t1 | t1' | 2 | t8 | ~1609 |
| 2 | D1 | t2 | t2' | 4 | t9 | ~1610 |

SPOKEN DOCUMENT RETRIEVAL SYSTEM

CLAIM OF PRIORITY

The present application claims priority from Japanese patent application JP 2007-301891 filed on Nov. 21, 2007, the content of which is hereby incorporated by reference into this application.

BACKGROUND OF THE INVENTION

1. Field of the Invention

The present invention relates to a spoken document retrieval system designed to retrieve where a user-specified keyword is uttered from spoken documents and to present retrieved results to a user.

2. Description of the Related Art

There have been proposals of technologies disclosed in Japanese Patent Application Publications Nos. 2002-221984, 2002-278579 and 2005-257954 as the technology of retrieving where a user-specified keyword is uttered from spoken documents.

The technology disclosed in Japanese Patent Application Publication No. 2002-221984 involves converting each of spoken documents and a keyword into a sequence of sub-phonemes; and then, retrieving the sequence of sub-phonemes converted from the keyword, from the sequences of sub-phonemes converted from the spoken documents, with use of word spotting method using dynamic programming. The technology disclosed in Japanese Patent Application Publication No. 2002-278579 involves converting each of spoken documents and a search word into a sequence of speech symbols; then, detecting candidate speech periods, with use of a full text retrieval system; and further, subjecting the candidate speech periods to speech recognition using the word spotting method, thereby determining retrieved results. The technology disclosed in Japanese Patent Application Publication No. 2005-257954 involves generating new sequences of phonemes or syllables for a keyword in a way that a phoneme in a sequence of phonemes or syllables generated from the keyword is replaced with another phoneme on the basis of expansion rules determined by statistics of occurrence frequency of phonemes; and perform retrieval by comparing the new sequences of phonemes or syllables with the sequences of phonemes or syllables targeted for retrieval.

Also, there has been a proposal of a method disclosed in Japanese Patent Application Publication No. 2001-125903 as a more general technology of retrieving a data sequence. In the method disclosed in Japanese Patent Application Publication No. 2001-125903, data sets of similar reference data sequences in advance are created by sorting reference data sequences by unit of data. When a data sequence is inputted as a query, one or more data sets similar to each data item in the query are selected from the created data sets. Then, a histogram for each data item in the selected data sets is created in a way that positions, corresponding to the each data item, on the temporal axis in the reference data sequences are each voted in consideration of the temporal order relation between the reference data sequences. Thereafter, a continuous range of the histogram is judged as a retrieved result.

SUMMARY OF THE INVENTION

The above-mentioned conventional technologies are intended for high-speed and high-accuracy retrieval of spots corresponding to a user-specified keyword or data sequence from spoken documents or data sequences. However, the conventional technologies pose problems when the spoken documents or data sequences are large in amount.

The technology disclosed in Japanese Patent Application Publication No. 2002-221984, for example, involves converting the spoken documents and the keyword into the sequences of sub-phonemes, which then is followed by performing a retrieval using the dynamic programming. The sequence of sub-phonemes consists of symbols and thus allows high-speed retrieval as compared to the technology of retrieval based on acoustic parameters of speech; however, this technology needs detailed comparison between the sequences to allow for variations in the length of spoken time. Consequently, if the amount of spoken documents targeted for retrieval is large, the retrieval time is not negligible.

The technology disclosed in Japanese Patent Application Publication No. 2002-278579 employs full text retrieval technology for use in text retrieval thereby to achieve a quick narrowing down of candidates. However, in the case of the use of the full text retrieval technology, whether the speech symbols that constitute the search word are contained in each of the spoken documents targeted for retrieval is the sole criterion for judgment, and thus, the speech symbols contained in the spoken documents are often judged as the candidates for retrieval, for example even if the speech symbols therein are in different order. Also, longer lengths of spoken documents (or candidate speech periods) targeted for retrieval lead to a greater likelihood that the speech symbols that constitute the search word will be included in anywhere other than where the search word is actually uttered, and in turn, also to a higher percentage of extra candidates that can possibly be detected. Further, the full text retrieval technology renders it difficult to determine in detail the position of the search word contained in each of the spoken documents, and thus, the time required for the subsequent word spotting process, likewise, is not negligible. As mentioned above, the method using the full text retrieval technology also presents a problem in the retrieval time, if the amount of spoken documents targeted for retrieval is large.

The method disclosed in Japanese Patent Application Publication No. 2001-125903 may be expected to achieve a high-speed processing for creation of the histogram; however, the detection of the continuous range requires checks to be made on the entire range on the time axis of the data sequences targeted for retrieval, and thus, this method likewise presents a problem in the retrieval time, if the amount of spoken documents targeted for retrieval is large.

Speech recognition technology, on the other hand, is used to convert the spoken documents into the sequence of sub-phonemes, or the sequence of speech symbols, the sequence of phonemes, the sequence of syllables, or the like; however, the speech recognition technology generally has the problem of the occurrence of recognition errors. The technologies disclosed in Japanese Patent Application Publications Nos. 2002-221984 and 2005-257954 are designed to achieve an improvement in retrieval accuracy, assuming that the recognition errors occur. The technology disclosed in Japanese Patent Application Publication No. 2002-221984 predefines the distance between certain sequences of sub-phonemes thereby to deal with the recognition errors; however, this technology merely provides definitions of the distance between typical sub-phonemes for handling of the recognition errors, which cannot be safely said to be adequate to handle the recognition errors on the occasion of their occurrence. On the other hand, the technology disclosed in Japanese Patent Application Publication No. 2005-257954 improves the retrieval accuracy as follows. Firstly, this technology statistically determines the likelihood of the occurrence of recognition errors, and sets rules on the likelihood. Then, a certain speech symbol in the sequence of speech symbols generated from the search word is replaced with another one to generate a new sequence of speech symbols for the search word. Thereafter, the retrieval for the search word is executed using the new sequence of speech symbols. However, this technology executes retrieval on each of the sequences of speech symbols generated by various replacements and integrates retrieved results, and thus, there is an increase in the length of the retrieval time in proportion to the number of sequences of speech symbols generated, which in turn limits the number of sequences of speech symbols that may be generated.

In order to solve the above problems and achieve high-speed and high-accuracy retrieval of a portion of a spoken document in which a user-specified keyword is uttered from a large amount of spoken documents, a spoken document retrieval system according to the present invention, first, converts a spoken document into a sequence of subwords such as phonemes, syllables or a phoneme n-gram, using speech recognition technology, and also records the correspondence between each subword and its position in the spoken document as a correspondence table between subwords and spoken documents.

Then, if a user specifies a keyword, a sequence of subwords is generated from the keyword, and the position of a subword at the beginning of the sequence of subwords in the spoken document is obtained from the correspondence table between subwords and spoken documents. A candidate period is generated, and the candidate period starts at the obtained position of the subword in the spoken document and has a length of time determined based on the length of the sequence of subwords generated from the keyword. A comparison is performed between the sequence of subwords contained in the generated candidate period and the sequence of subwords generated from the keyword, or a comparison is performed between an acoustic parameter extracted from the spoken document in a range corresponding to the generated candidate period and an acoustic parameter generated from the keyword, thereby to determine a candidate period to be outputted as a retrieved result.

Here, a complementary rule is prepared beforehand, assuming that any one of replacement, deletion and insertion, which is a speech recognition error, occurs, and complementation is performed on each subword in the sequence of subwords generated from the keyword, assuming that the speech recognition error occurs, based on the complementary rule. As a result of the complementation, candidate periods are generated for all subwords that can possibly appear at the beginning of the sequence of subwords.

Also, the selection of the candidate period to be outputted as the retrieved result includes retrieving a candidate period containing each subword in the sequence of subwords generated from the keyword, and performing addition to a count value assigned to the retrieved candidate period. Additions to the count values of candidate periods for all subwords in the sequence of subwords generated from the keyword are performed, and then, the candidate periods are prioritized based on the count values, and a candidate period to be outputted as a retrieved result is selected based on the result of prioritization.

According to the present invention, the simple process of narrowing down candidate periods, in advance, based on a sequence of subwords generated from a keyword, and also performing addition to the count values of the candidate periods containing the subwords is performed to assign priorities to the candidate periods and thereby select candidate periods to be retrieved results, and this enables high-speed spoken document retrieval. Also, complementation of the sequence of subwords generated from the keyword, assuming that speech recognition errors occur, is followed by candidate period generation, and this enables high-accuracy spoken document retrieval.

BRIEF DESCRIPTION OF THE DRAWINGS

FIG. 3 is a table showing the form of information stored in a correspondence table between subwords and spoken documents.

FIG. 4 is a representation showing an example of the result of conversion of a keyword into a sequence of subwords.

FIG. 5 is a table showing an example of information stored in the correspondence table between subwords and spoken documents.

FIGS. 9A to 9E are tables showing changes in the count values of the candidate periods with the progress of processing.

FIG. 12 is a representation showing an example of a complemented sequence of subwords.

FIG. 13 is a table showing an example of the contents of candidate periods generated through the complementation of the sequence of subwords.

FIGS. 16A to 16E are tables showing an example of changes in values stored as the start positions of the subwords, with addition to the count values.

DESCRIPTION OF THE PREFERRED EMBODIMENTS

Description will be given below with regard to embodiments of the present invention.

First Embodiment

A first embodiment of the present invention will be described with reference to FIGS. 1 to 9E.

Figure 1:
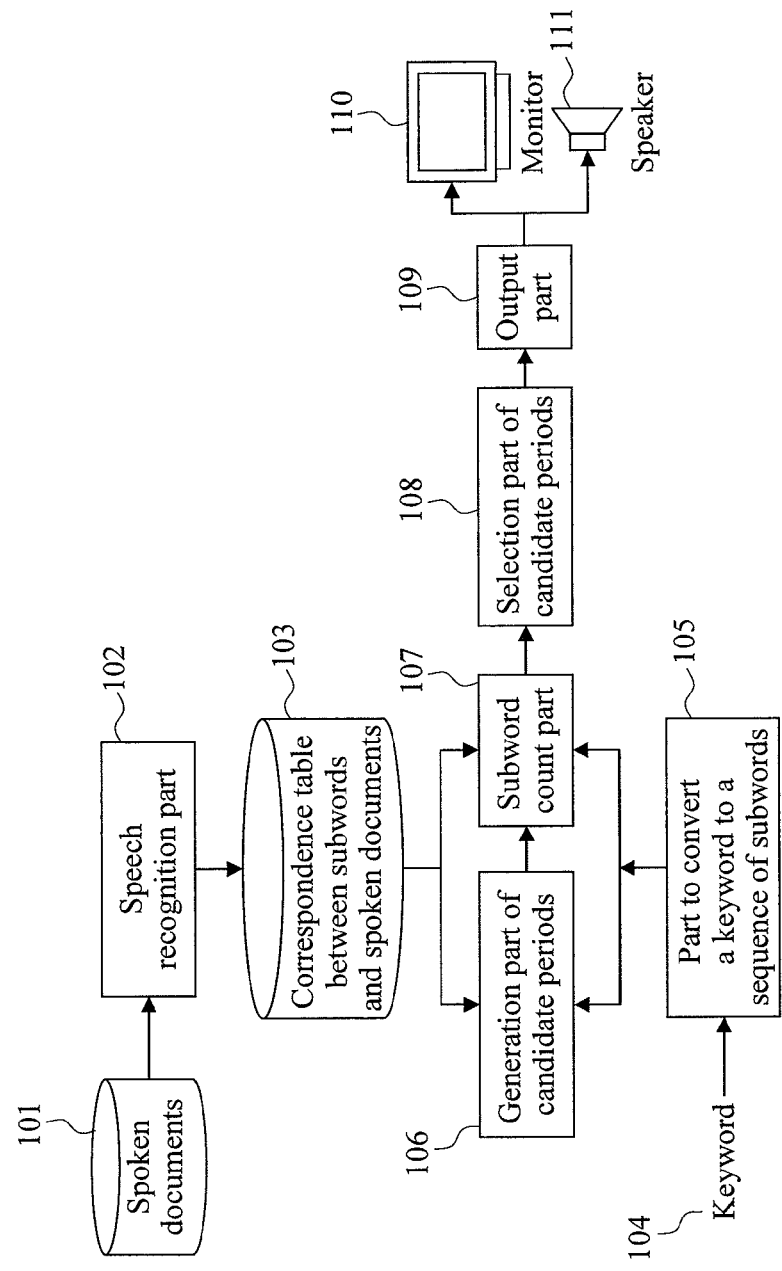
FIG. 1 is a conceptual block diagram showing an example of the configuration of a spoken document retrieval system according to a first embodiment of the present invention as applied thereto.

FIG. 1 is a conceptual block diagram showing an example of the configuration of a spoken document retrieval system according to the first embodiment of the present invention. In FIG. 1, reference numeral 101 denotes spoken documents targeted for retrieval, which are assumed as those prepared by the documentation of speech extracted from recorded television programs or recorded speech at meetings, lectures or the like. As employed here, the spoken documents are filed and recorded by television program or by lecture.

Reference numeral 102 denotes a speech recognition part configured to convert the spoken documents into subwords such as phonemes, syllables, or a phoneme n-gram, for which speech recognition technology well known as technology for converting speech into characters is available. The speech recognition technologies include technology capable of direct output of object subwords, and further, the technology capable of character output may be used in combination with well-known natural language processing such as morphological analysis to facilitate obtaining the subwords. Further, the speech recognition part 102 of the present invention creates information indicative of the correspondence between the subwords obtained from the spoken documents and the spoken documents, which then in turn is stored in a correspondence table 103 between subwords and spoken documents.

Reference numeral 104 denotes a user-entered keyword, and where utterance of the keyword occurs is retrieved from the spoken documents 101. As employed here, the keyword is in any one of the form of a character string entered from a keyboard and the form of speech entered through a microphone. A part 105 to convert a keyword to a sequence of subwords converts the keyword 104 into a sequence of subwords. If the keyword is in the form of the character string, the well-known natural language processing may be used to facilitate the conversion of the keyword into the sequence of subwords. Also, if the keyword is predictable in advance, a keyword-to-subword-sequence correspondence table may be prepared beforehand and searched to facilitate obtaining the sequence of subwords. Also, if the keyword is in the form of the speech, the well-known speech recognition technology may be used to facilitate the conversion of the keyword into the sequence of subwords, as in the case of the conversion of the spoken documents 101 into the subwords.

In FIG. 1, a generation part 106 of candidate periods generates candidate periods, which are predicted periods in the spoken documents, in which the utterance of the keyword 104 is likely to occur, based on the sequence of subwords obtained from the keyword 104 and the contents of the correspondence table between subwords and spoken documents. Further, a subword count part 107 counts how many subwords belonging to the sequence of subwords obtained from the keyword 104 are contained in the candidate periods, based on the contents of the correspondence table between subwords and spoken documents. A selection part 108 of candidate periods assigns priorities to the candidate periods thereby to select candidate periods to be outputted, based on counted results obtained by the subword count part 107. An output part 109 outputs information on the candidate periods selected by the selection part 108 of candidate periods to a monitor 110 for display, and also outputs speech corresponding to the candidate periods to a speaker 111.

Figure 2:
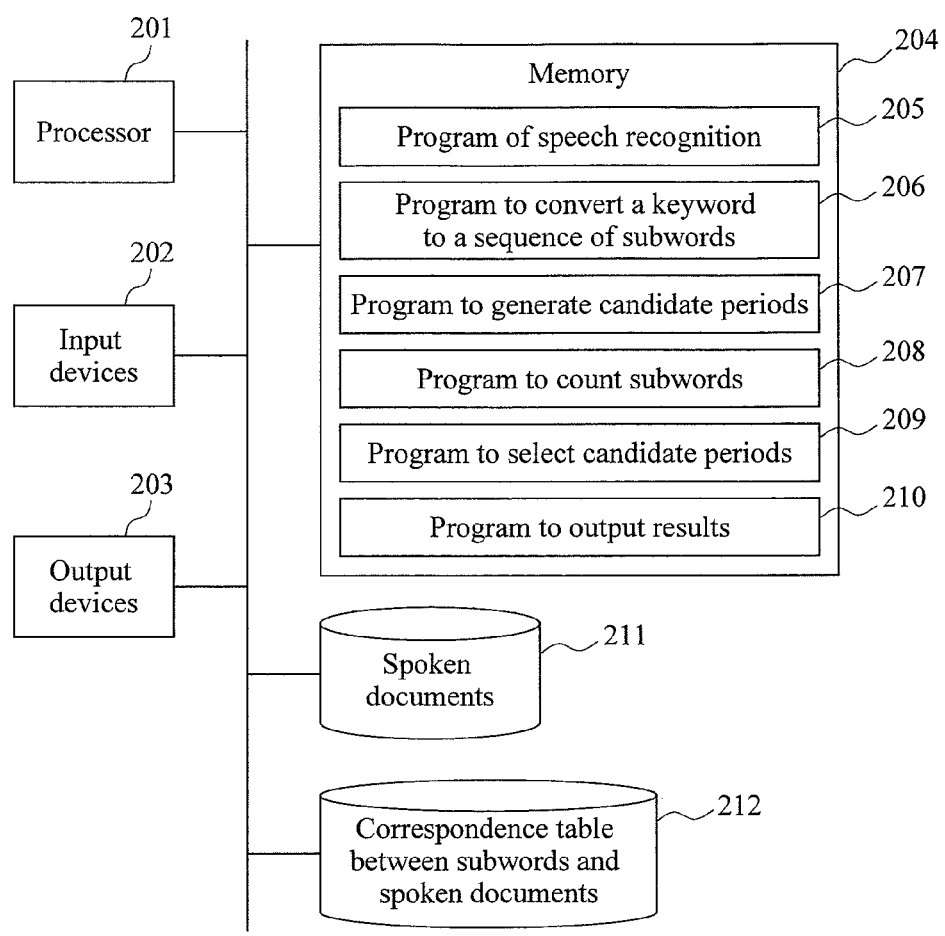
FIG. 2 is a block diagram of the configuration of the spoken document retrieval system according to the first embodiment of the present invention as applied thereto, as implemented on a computer.

FIG. 2 is a block diagram of the configuration of the spoken document retrieval system shown in FIG. 1 as implemented on a computer in general use. In FIG. 2, reference numeral 201 denotes a processor for execution of various programs required for spoken document retrieval. Reference numeral 202 denotes input devices for entry of the keyword 104 shown in FIG. 1, and the keyboard may be used as the input device for the keyword in the form of the character string, or the microphone may be used as the input device for the keyword in the form of the speech. Output devices 203 are the devices for output of retrieved results, and correspond to the monitor 110 and the speaker 111 shown in FIG. 1. In FIG. 2, reference numeral 204 denotes a memory for storage of the various programs required for the spoken document retrieval or information on the status of processing in progress. Reference numeral 205 denotes a program of speech recognition for processing corresponding to the speech recognition part 102 shown in FIG. 1; 206, a program to convert a keyword to a sequence of subwords for processing corresponding to the part 105 to convert a keyword to a sequence of subwords; 207, a program to generate candidate period for processing corresponding to the generation part 106 of candidate periods; 208, a program to count subwords for processing corresponding to the subword count part 107; 209, a program to select candidate periods for processing corresponding to the selection part 108 of candidate periods; and 210, a program to output results for processing corresponding to the output part 109. Further, spoken documents 211 and a correspondence table 212 between subwords and spoken documents correspond to the spoken documents 101 and the correspondence table 103 between subwords and spoken documents, respectively, shown in FIG. 1.

Description will be given with reference to FIG. 3 with regard to the form of the information stored in the correspondence table 103 between subwords and spoken documents. The information outputted by the speech recognition part 102 is the sequence of subwords obtained by speech recognition of the spoken documents stored in the spoken documents 101, and, as employed here, each subword is assigned information indicative of its position in the spoken documents, such for example as the length of elapsed time measured after the start of the spoken documents, or a numeric value indicating which time slot it belongs to in the spoken documents as divided into time slots in predefined lengths of time. The well-known speech recognition technology may be used to facilitate finding out the positions of the subwords in the spoken documents. The speech recognition part 102 creates the correspondence between the subwords and their positions in the spoken documents from the information on the subwords obtained from the spoken documents, which then in turn is stored as the correspondence table 103 between subwords and spoken documents in the form shown in FIG. 3.

In FIG. 3, a subword name 301 is a character string indicative of the name of a target subword, a recorded count 302 is the count of information items on the corresponding position of the target subword in the spoken documents, spoken document names 303 and 305 are character strings indicative of the names of the spoken documents in which the target subword is recognized, and reference numerals 304 and 306 denote numeric values indicative of the start positions of the target subword in the spoken documents. The correspondence table between subwords and spoken documents facilitates finding out which spoken document each subword is recognized in and where it is recognized therein. In FIG. 3, the subword's start position is shown as recorded alone; however, its end position also may be recorded.

Description will now be given with reference to FIGS. 4 to 7 with regard to the processing by the generation part 106 of candidate periods. FIG. 4 shows the user-entered keyword "speech recognition" as converted into a sequence of subwords by the part 105 to convert a keyword to a sequence of subwords. Here, the subwords are shown as being phonemes for sake of simplicity. Hereinafter, description will be likewise given assuming that the subwords are the phonemes; however, even if the subwords are syllables, a phoneme n-gram or the like, the subwords are merely expressed in different notation, and there is no essential difference.

In FIG. 4, reference numeral 401 denotes the user-entered keyword; and 402, the sequence of subwords generated from the keyword. The conversion of the keyword into the sequence of subwords can be accomplished by using the well-known natural language processing, or by preparing beforehand a correspondence table between keywords and sequences of subwords and referring to the correspondence table.

FIG. 5 is a table showing an example of the correspondence table 103 between subwords and spoken documents. In FIG. 5, reference numeral 501 denotes part of recorded information on the subword "s"; 502, on the subword "p"; 503, on the subword "i:"; and 504, on the subword "tʃ." In the case of, for example, the subword "s," it can be seen from the table that the recorded count is Ns, and the subword "s" is recognized at the start position t1 of a spoken document D1, at the start position t2 of the spoken document D1, at the start position t3 of a spoken document D2, and at other positions.

Figure 6:
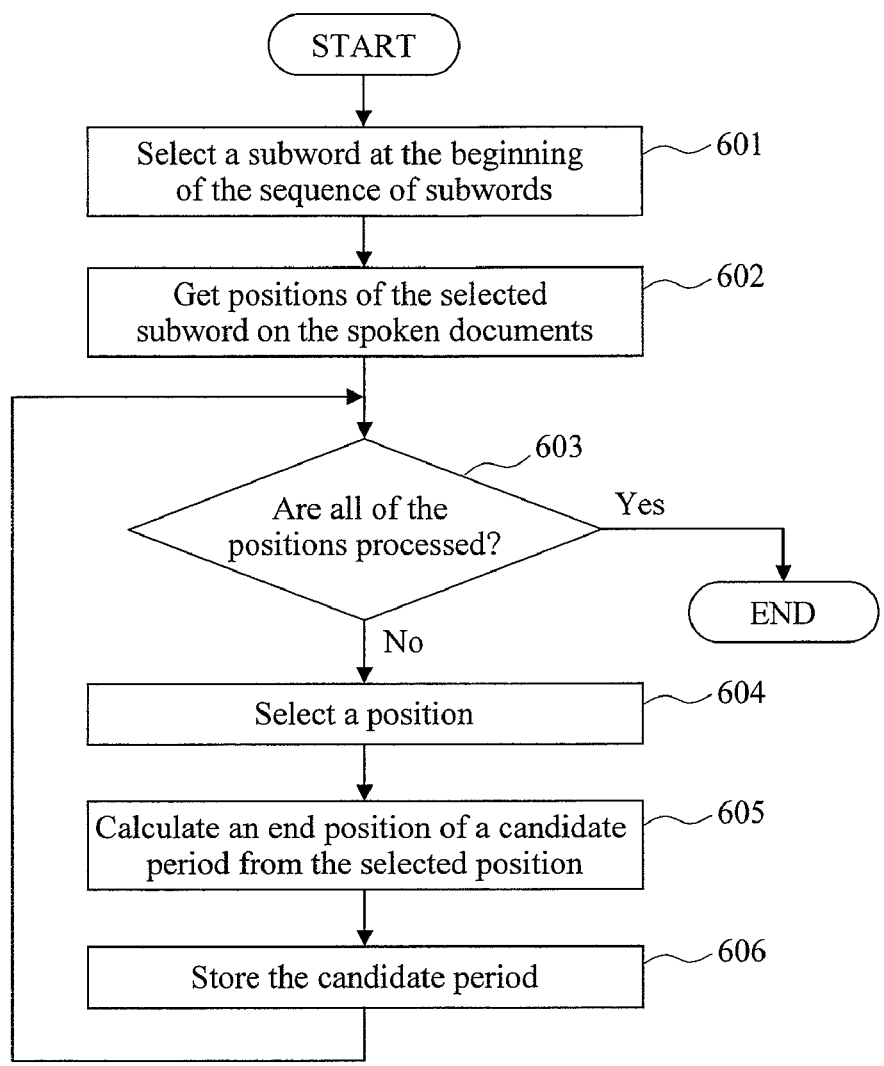
FIG. 6 is a flowchart showing the flow of a process for candidate period generation.

FIG. 6 shows a flowchart of the processing by the generation part 106 of candidate periods. First, at step 601, the generation part 106 of candidate periods selects a subword at the beginning of the sequence of subwords into which the user-entered keyword is converted. If the user-entered keyword is the keyword shown in FIG. 4, the subword "s" is selected. Then, at step 602, information on the subword selected at step 601 is obtained from the correspondence table 103 between subwords and spoken documents. If the contents of the correspondence table between subwords and spoken documents are those shown in FIG. 5, the contents designated by 501, which are the information corresponding to the subword "s," are obtained here. At step 603, a determination is made as to whether the following processing has been performed on all position information items contained in the information obtained at step 602. If the processing of all position information items is completed, the generation part of candidate periods brings the processing to an end. If this is not the case, the processing goes to step 604.

At step 604, a piece of subword position information is selected from the information obtained at step 602. If the correspondence table 103 between subwords and spoken documents is in the form shown in FIG. 3, a set of a spoken document name and a start position is selected as the position information. At step 605, after the start position of a candidate period is determined as a position indicated by the selected position information, the end position of the candidate period is determined as a position after a lapse of a predefined length of time from the start position. Here, a method for determining the end position can be accomplished by the following equation:

$$T2 = T1 + N \times L$$

where T1 represents the start position; N, the number of subwords belonging to the sequence of subwords generated from the user-entered keyword; L, the average length of time of the subword; and T2, the end position. The average length of time of the subword can be easily calculated by preparing beforehand several sampled spoken documents, and adding up the lengths of time of subwords obtained by recognition of the spoken documents. Also, the length of time of the candidate period may be calculated for example by multiplying the number of moras of the keyword by the average length of time per mora, using mora that is the unit of the length of speech, rather than using the number of subwords. The number of moras can be obtained from the sequence of subwords, by preparing beforehand the relationship between the subwords and the moras as rules. Finally, at step 606, information on the candidate period determined at step 605 is recorded, and the processing returns to step 603.

Figures 7, 8:
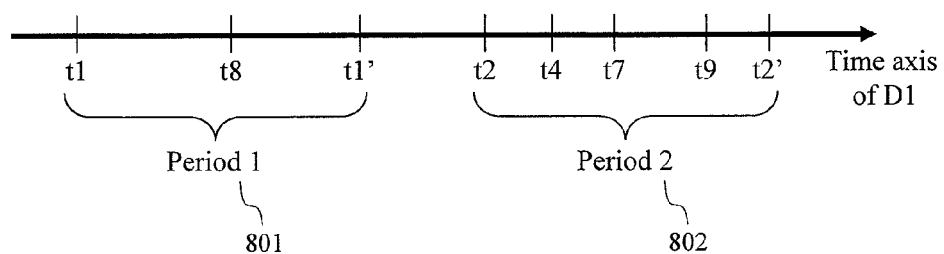
FIG. 7 is a table showing an example of the contents of generated candidate periods.
FIG. 8 is a representation showing an example of the temporal positions of the generated candidate periods and subwords contained therein.

The information on the candidate period recorded through the above processing is stored in such a form as is shown in FIG. 7. In FIG. 7, the "number of period" column, designated by 701, contains numbers assigned to the candidate periods, which are consecutive numbers assigned thereto in the order in which they are recorded. Anything may be used as the numbers of the periods, provided that they are symbols or numeric values for identification of the individual candidate periods. The "spoken document name" column, designated by 702, contains the names of the spoken documents containing the candidate periods, and information obtained from the correspondence table 103 between subwords and spoken documents is recorded as it is. The "start position" column, designated by 703, contains the start positions of the candidate periods, and likewise, information obtained from the correspondence table 103 between subwords and spoken documents is recorded as it is. The "end position" column, designated by 704, contains the end positions of the candidate periods determined at step 605 in FIG. 6. The "count value" column, designated by 705, contains areas for count of the number of subwords, to which zero is assigned as their initial value. Three position information items are presented in the contents designated by 501 in FIG. 5, and thus, in FIG. 7, candidate periods 706, 707 and 708 corresponding to the position information items, respectively, are recorded. Also, the end positions of the candidate periods 706, 707 and 708 are given by the following equations:

$$t1' = t1 + N \times L$$

$$t2' = t2 + N \times L$$

$$t3' = t3 + N \times L$$

where N represents the number of subwords belonging to the sequence of subwords generated from the keyword; and L, the average length of time of the subword, as is the case with the above.

Description will now be given with reference to FIG. 8 and FIGS. 9A to 9E with regard to the processing by the subword count part 107 shown in FIG. 1. Here, the times of t1, t2, t4, t7, t8 and t9 in FIG. 5 and t1' and t2' in FIG. 7 are such that the relationship is established as shown in FIG. 8, focusing on subword information on the spoken document D1. In this instance, target candidate periods are the candidate periods 706 and 707 alone, shown in FIG. 7. In FIG. 8, reference numeral 801 denotes a period corresponding to the candidate period given the period number 1 in FIG. 7; and 802, a period corresponding to the candidate period given the period number 2 therein. The subword count part 107 repeats the following processing: the subword count part 107 performs checks on the subwords belonging to the sequence of subwords generated from the keyword, one after another, to see whether the subwords are contained in the candidate periods, and adds 1 to the count value if a subword is contained.

FIGS. 9A to 9E show changes in the count value, which take place when this processing is performed on the "s p ɾ: tʃ" portion of the sequence of subwords shown in FIG. 4. FIG. 9A shows the count value before the start of the processing, and reference numerals 901 and 902 denote the count values as initialized to zero, as in the case of those indicated by 706 and 707 in FIG. 7. FIG. 9B shows the count value after the processing on the subword "s." The subword "s" is contained in both candidate periods, and thus, the count values after the processing are both incremented to 1, as indicated by 903 and 904. FIG. 9C shows the count value after the processing on the subword "p." The subword "p" is contained only in the candidate period given the period number 2, and thus, the count value indicated by 905 remains at 1, while only the count value indicated by 906 is incremented to 2. Further, the subword "ɾ:" is likewise contained only in the candidate period given the period number 2, and thus, the count value indicated by 907 remains at 1, while the count value indicated by 908 is incremented to 3, as shown in FIG. 9D. The subword "tʃ" is contained in both candidate periods, and thus, the count values indicated by 909 and 910 are incremented by 1 to 2 and 4, respectively, as shown in FIG. 9E.

The above processing determines whether "1" should be added to the count values of the candidate periods, according to whether the target subwords are contained in the candidate periods; however, a value to be added may be variable, based on the positions of the target subwords in the candidate periods. For example, the following processing may be performed: if the target subwords lie between (M×L) and (M×(L+1)) of the candidate periods, "1" is added to the count values, while, otherwise, "0.5" is added to the count values, where M represents the order in which the target subwords appear in the sequence of subwords generated from the keyword; and L, the average length of time of the subword. If it is desired that the count values be integers alone, the following processing, for example, may be performed: if the target subwords lie within the above-mentioned range, "2" is added to the count values, while, otherwise, "1" is added to the count values.

The selection part 108 of candidate periods assigns priorities to the candidate periods thereby to select candidate periods to be outputted, based on the count values of the candidate periods. A method for prioritization can be accomplished by arranging the candidate periods in decreasing order of the count value of the candidate period. Also, the evaluation values of recognized subwords may be acquired, depending on which speech recognition technology is used, and, if so, the product of the count values and the evaluation values, or the like may be used as the evaluation values of the candidate periods for the prioritization. Further, if the number of candidate periods selected is large, a threshold value may be set for the count value or the evaluation value so as to select only candidate periods having values more than the threshold value. The number of subwords belonging to the sequence of subwords into which the keyword is converted, multiplied by a predefined coefficient, or the like can be used as the threshold value of the count value. An equation, such for example as "the number of subwords×0.8," may be used for determination of the threshold value. Further, the prioritization of the spoken documents may be performed based on the selected candidate periods. A method for the prioritization can be accomplished for example by adding up the number of candidate periods in each spoken document, and arranging the spoken documents in decreasing order of the number of candidate periods. Also, the sum of the count values or evaluation values of each spoken document, the average count value or evaluation value of each spoken document, the product of the number of candidate periods and the average count value or evaluation value, the weighted sum of the number of candidate periods and the average count value or evaluation value, or the like may be used for the prioritization.

The output part 109 outputs the candidate periods and the spoken documents selected by the selection part 108 of candidate periods to the monitor 110 and the speaker 111.

Besides the above, the method for the prioritization of the candidate periods may be accomplished by extracting a sequence of subwords contained in the candidate periods, and performing a comparison between the sequence of subwords generated from the keyword and the extracted sequence of subwords, using well-known technology such as dynamic programming, thereby to determine similarity between the sequences of subwords. In this instance, the sequence of subwords obtained by speech recognition of the spoken documents may be stored for quick extracting of the subwords contained in the candidate periods. Further, acoustic parameters used for the speech recognition of the spoken documents may be stored so as to allow a comparison between the acoustic parameters contained in the candidate periods and the acoustic parameters generated from the keyword, using the well-known technology such as the dynamic programming or a hidden Markov model (HMM), for the prioritization of the candidate periods. The conversion of the keyword into the acoustic parameters can be easily accomplished by preparing typical acoustic parameters for each individual subword, and establishing the association of the acoustic parameters for the individual subwords. Incidentally, the dynamic programming and HMM are described for example in Chapter 16 "Dynamic Programming" (pp. 385-411) and Chapter 7 "HMM (Hidden Markov Model" (pp. 159-184) in "Automatic Speech & Speaker Recognition," edited by Chin-Hui. Lee, Frank K. Soong and Kuldip K. Paliwal, Kluwer Academic Publishers (1996).

Second Embodiment

A second embodiment of the present invention will be described with reference to FIGS. 10 to 14.

Figure 10:
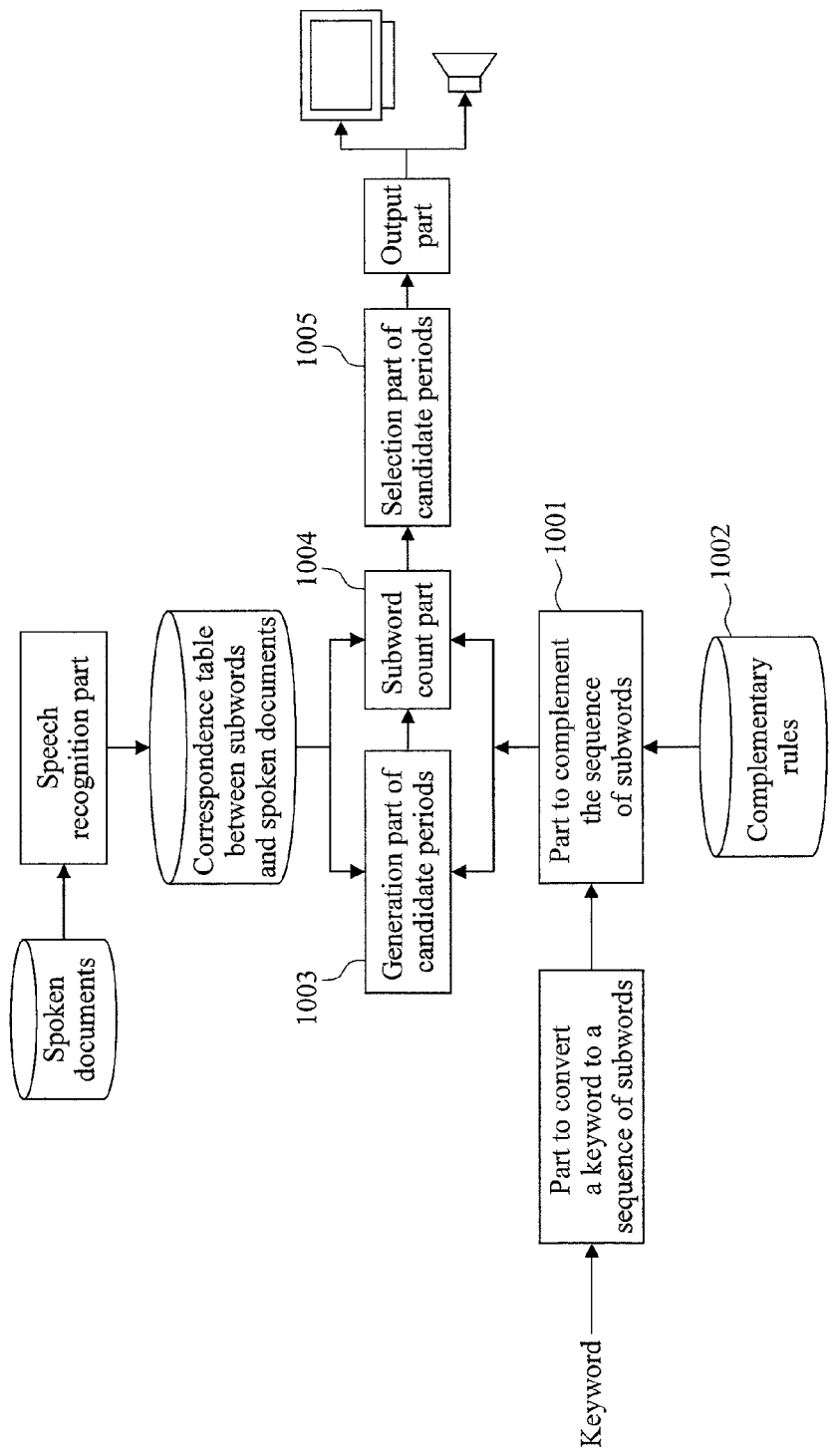
FIG. 10 is a conceptual block diagram showing an example of the configuration of a spoken document retrieval system according to a second embodiment of the present invention as applied thereto.
Figure 11:
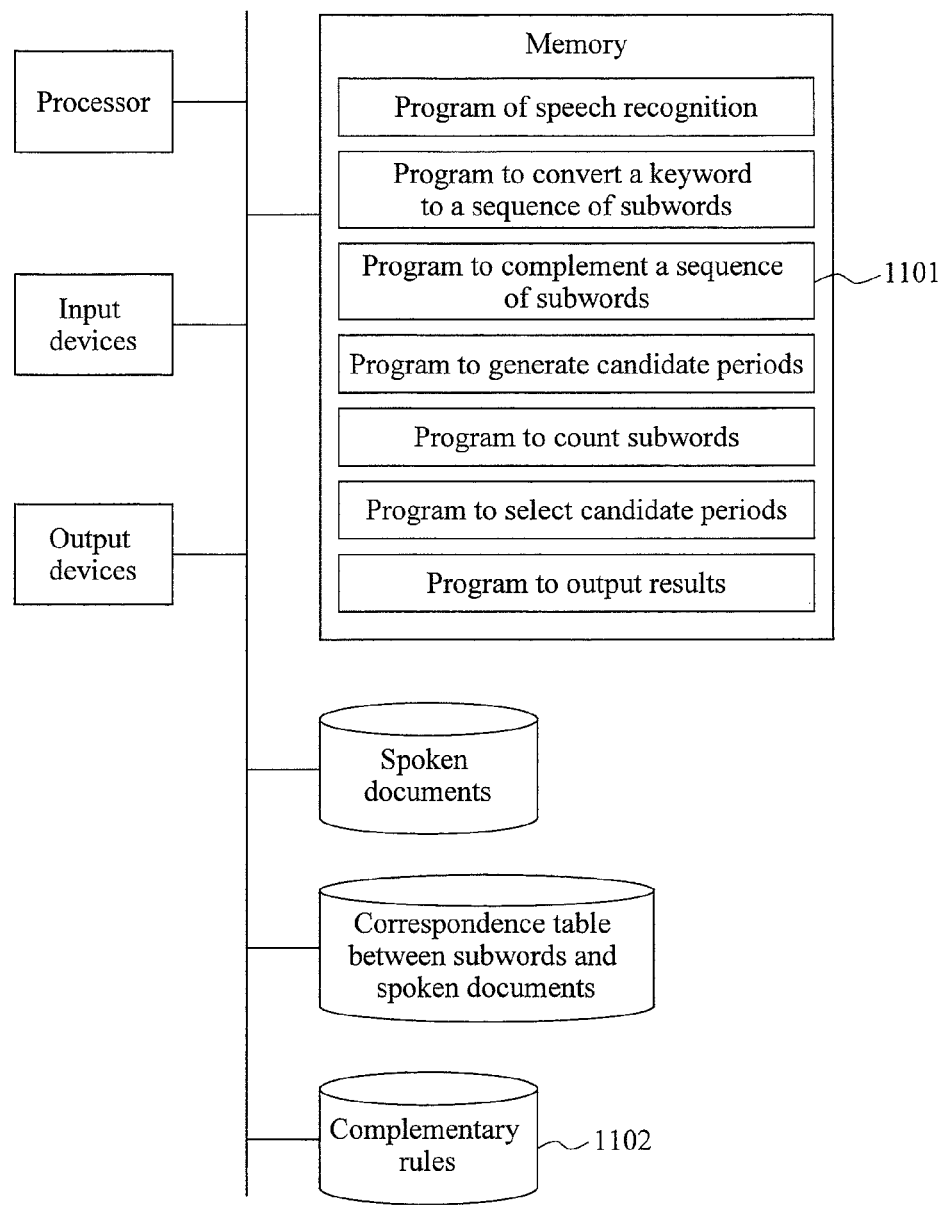
FIG. 11 is a block diagram of the configuration of the spoken document retrieval system according to the second embodiment of the present invention as applied thereto, as implemented on a computer.
Figure 14:
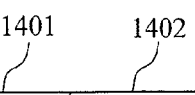
FIG. 14 is a table showing an example of the contents of candidate periods in an instance where storage areas for two types of count values are provided for the candidate periods.

FIG. 10 is a conceptual block diagram showing an example of the configuration of a spoken document retrieval system according to the second embodiment of the present invention. The system shown in FIG. 10 is configured by further including a part 1001 to complement the sequence of subwords and complementary rules 1002, in addition to the configuration shown in FIG. 1. FIG. 11 is a block diagram of the configuration of the spoken document retrieval system according to the second embodiment of the present invention as implemented on a computer in general use. The configuration shown in FIG. 11 further includes a program 1101 to complement a sequence of subwords for execution of processing corresponding to the part 1001 to complement the sequence of subwords, and information corresponding to the complementary rules 1002, in addition to the configuration shown in FIG. 2.

The part 1001 to complement the sequence of subwords shown in FIG. 10 subjects a sequence of subwords generated from a user-entered keyword to a further process to complement subwords that can possibly be predicted at the occurrence of recognition errors in speech recognition, based on the contents of the complementary rules 1002. Subword complementation can be easily accomplished by preexecuting speech recognition on several sample spoken documents; obtaining information indicating what kind of subword each subword is likely to be erroneously recognized as, in conjunction with information indicating how often it occurs, how each subword is linked to subwords before and after it, or the like, based on recognized results; and using the obtained information as complementary rules, as disclosed in Japanese Patent Application Publication No. 2005-257954.

FIG. 12 shows an example of a complemented sequence of subwords. In FIG. 12, reference numeral 1201 denotes the sequence of subwords generated from the keyword, and subwords shown in the rows designated by 1202 and 1203 refer to complemented subwords. Here, the contents designated by 1202 and 1203 do not indicate that the subwords "s p $_j$: tʃ" is complemented to "z k $_j$: tʃ," for example, but indicate that some of the subwords are likely to be erroneously recognized as the correspondingly-shown subwords. More specifically, the contents indicate that the subword "s" is likely to be erroneously recognized as "z" and "-" and the subword "p" is likely to be erroneously recognized as "k." Incidentally, "-" indicates that a corresponding subword is not recognized (or is deleted).

A generation part 1003 of candidate periods performs candidate period generation, using the complemented sequence of subwords. The generation part 1003 of candidate periods is different from the generation part of candidate periods according to the first embodiment in that, first, at step 601 in FIG. 6, the generation part 1003 of candidate periods selects all subwords that can possibly appear at the beginning of the sequence of subwords, from the complemented sequence of subwords. If the complemented sequence of subwords is the sequence of subwords shown in FIG. 12, the subwords that can possibly appear at the beginning of the sequence of subwords are "s," "z," "p" and "k," allowing also for unrecognized subwords. At step 602, position information on all these selected subwords is obtained from the correspondence table 103 between subwords and spoken documents. Steps 604 to 606 are executed on all the obtained position information items. If the contents of the correspondence table 103 between subwords and spoken documents are those shown in FIG. 5, such candidate periods as are shown in FIG. 13 are generated from the information on the subwords "s" and "p." The candidate periods shown in FIG. 13 include addition of candidate periods 1301, 1302 and 1303 on the subword "p," as compared to the candidate periods shown in FIG. 7.

A subword count part 1004 determines whether each of all subwords belonging to the complemented sequence of subwords is present in the candidate periods, and, if a subword is present in a candidate period, the subword count part 1004 adds 1 to the count value of the candidate period.

A selection part 1005 of candidate periods assigns priorities to the candidate periods and also assigns priorities to the spoken documents thereby to select candidate periods to be outputted, based on the count values of the candidate periods, as in the case of the first embodiment.

Also, the count values of the candidate periods may be determined by separately calculating the count values based only on the subwords generated from the keyword, and the count values based on the subwords added through the complementation, in order that the percentage thereof is utilized for the prioritization of the candidate periods or the spoken documents. For this purpose, the form of storage of candidate period information may be such that two types of count values are prepared as indicated by 1401 and 1402 in FIG. 14, and, for example, the count values based on the subwords generated from the keyword, and the count values based on the subwords added through the complementation are recorded in the "count value" columns designated by 1401 and 1402, respectively. Also, a method for the prioritization of the candidate periods may be accomplished for example by performing prioritization using the count values based on the subwords generated from the keyword, and then, further performing prioritization on the candidate periods having the same count value based on the subwords generated from the keyword, using the count values based on the subwords added through the complementation. Also, the method for the prioritization may use values calculated from both two types of count values, such as the weighted sum or weighted average of the count values based on the subwords generated from the keyword and the count values based on the subwords added through the complementation, as the evaluation values of the candidate periods for the prioritization.

Further, the count values of the candidate periods may be such that only one type of count value is used, and a value to be added to the count values, based only on the subwords generated from the keyword, is different from a value to be added to the count values, based on the subwords added through the complementation. For example, the following processing may be performed: if the subwords generated from the keyword are contained in the candidate periods, "2" is added to the count values, while, if the subwords added through the complementation are contained in the candidate periods, "1" is added to the count values. Also, if such technology as is disclosed in Japanese Patent Application Publication No. 2005-257954 is used as the complementary rules, the adding up of the frequency of occurrence of subwords in speech-recognized results enables obtaining an index indicating what subword a given subword is likely to be erroneously recognized as, and how often this recognition error occurs. The storage of such an index in the complementary rules enables more detailed specification of the value to be added to the count values if the subwords added through the complementation are contained in the candidate periods. Specifically, the following processing may be performed: "1.5" is added to the count values if a subword having a high possibility of recognition error is present in the candidate periods, "1.0" is added to the count values for a subword having a medium possibility of recognition error, or "0.5" is added to the count values for a subword having a low possibility of recognition error.

Further, a method for utilization of the complemented subwords may involve predetermining all sequences of subwords formed of all possible combinations of subwords inclusive also of the complemented subwords; determining candidate periods to be retrieved results, for each of the sequences of subwords; and then, establishing the association of the candidate periods for all of the sequences of subwords, thereby determining candidate periods to be outputted as final retrieved results. In this instance, weights may be assigned to the count values or evaluation values of the candidate periods, based on the number of subwords added through the complementation, contained in the sequence of subwords, thereby to effect the prioritization of all the candidate periods.

Third Embodiment

A third embodiment of the present invention will be described with reference to FIG. 15 and FIGS. 16A to 16E. In the first and second embodiments, even candidate periods in which subwords are in different order can possibly be selected as retrieved results, because these embodiments perform the process of performing addition to the count values of candidate periods if a corresponding subword is contained in the candidate periods.

Figure 15:
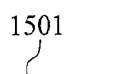
FIG. 15 is a table showing an example of the contents of candidate periods in an instance where a storage area for the start position of a subword determined by the previous process is provided for the candidate periods.

In the third embodiment, therefore, the storage of candidate period information is configured in such a form as is shown in FIG. 15. The form of storage shown in FIG. 15 is different from that shown in FIG. 7 in that there is provided a storage area 1501 for the start positions of subwords. The storage area for the start positions of subwords is assigned the start position of a subword judged as being contained in a candidate period, by the previous process of performing the addition to the count value. Also, for the addition to the count value, a comparison between P1 and P2 is performed, and the value to be added to the count value is changed according to the result of the comparison, where P1 represents the start position of the subword judged as being contained in the candidate period; and P2, a value stored in the storage area 1501 for the start positions of subwords. For example, the following processing is performed: if P1 is more than P2, "1" is added to the count value, while, if P1 is less than P2, the addition to the count value is not performed. Alternatively, the following processing may be performed: if P1 is more than P2, "1" is added to the count value, while, if P1 is less than P2, "0.5" is added to the count value, or alternatively, if P1 lies within a predefined length of time starting at P2, "1" is added to the count value, while, otherwise, "0.5" is added to the count value. Further, any one of combinations of these processes may be used for a method for determination of the count value, or the count value may be consecutively changed, based on the relationship between P1 and P2.

Description will be given with reference to FIGS. 16A to 16E with regard to processing by the subword count parts 107 and 1004 using the form shown in FIG. 15. For sake of simplicity, the following description will be given, not allowing for subwords added through complementation, assuming that a sequence of subwords contains "s p ʲ: tʃ" alone; however, the same goes for a sequence of subwords containing the subwords added through the complementation. FIG. 16A shows a state before the start of the processing, showing two candidate periods obtained by getting position information on the subword "s" from the correspondence table between subwords and spoken documents shown in FIG. 5. Here, areas 1601 and 1602 for the start positions of subwords are assigned "-" indicative of a blank. FIG. 16B shows a state after the processing on the subword "s," and areas 1603 and 1604 for the start positions of subwords are assigned the start positions t1 and t2, respectively, of the subword "s" in the candidate periods.

Further, FIG. 16C shows a state after the processing on the subword "p." In this instance, the processing is first performed only on the candidate period given the period number 2, since the subword "p" is contained only in the candidate period given the period number 2. Further, "1" is added to the count value of the candidate period given the period number 2 so that the count value is incremented to 2, since the start position t4 of the subword "p" is more than the start position t2 of the subword stored in the candidate period, as shown in FIG. 8. Also, the areas for the start positions of subwords are assigned the start positions of the subword "p," and, as a result, the start position of the subword in the candidate period given the period number 1 remains at t1 as indicated by 1605, while the start position of the subword in the candidate period given the period number 2 is changed to t4 that is the start position of the subword "p," as indicated by 1606. FIG. 16D shows a state after the processing on the subword "ʲ:". Also in this case, the processing is performed only on the candidate period given the period number 2, as in the case of the subword "p," and, as a result, the start position of the subword in the candidate period given the period number 1 remains at t1 as indicated by 1607, while the start position of the subword in the candidate period given the period number 2 is changed to t7 that is the start position of the subword "ʲ:", as indicated by 1608. FIG. 16E shows a state after the processing on the subword "tʃ." The subword "tʃ" is contained in the candidate periods given the period numbers 1 and 2, respectively, as shown in FIG. 8, and thus, the processing is performed on both of the candidate periods, so that the start positions of the subword in the candidate periods are changed to t8 and t9, respectively, as indicated by 1609 and 1610.

The form of the information on the candidate periods shown in FIG. 15 is such that only the start position of the subword determined by the previous process is recorded; however, the start positions of the subwords determined by all processes may be recorded. On the occasion of the addition to the count value, the use of this information makes it possible to check the appearance order relation between the subwords in the candidate periods, and thus facilitates selecting only candidate periods containing subwords appearing in the same order as a sequence of subwords generated from the keyword.

Fourth Embodiment

Figure 17:
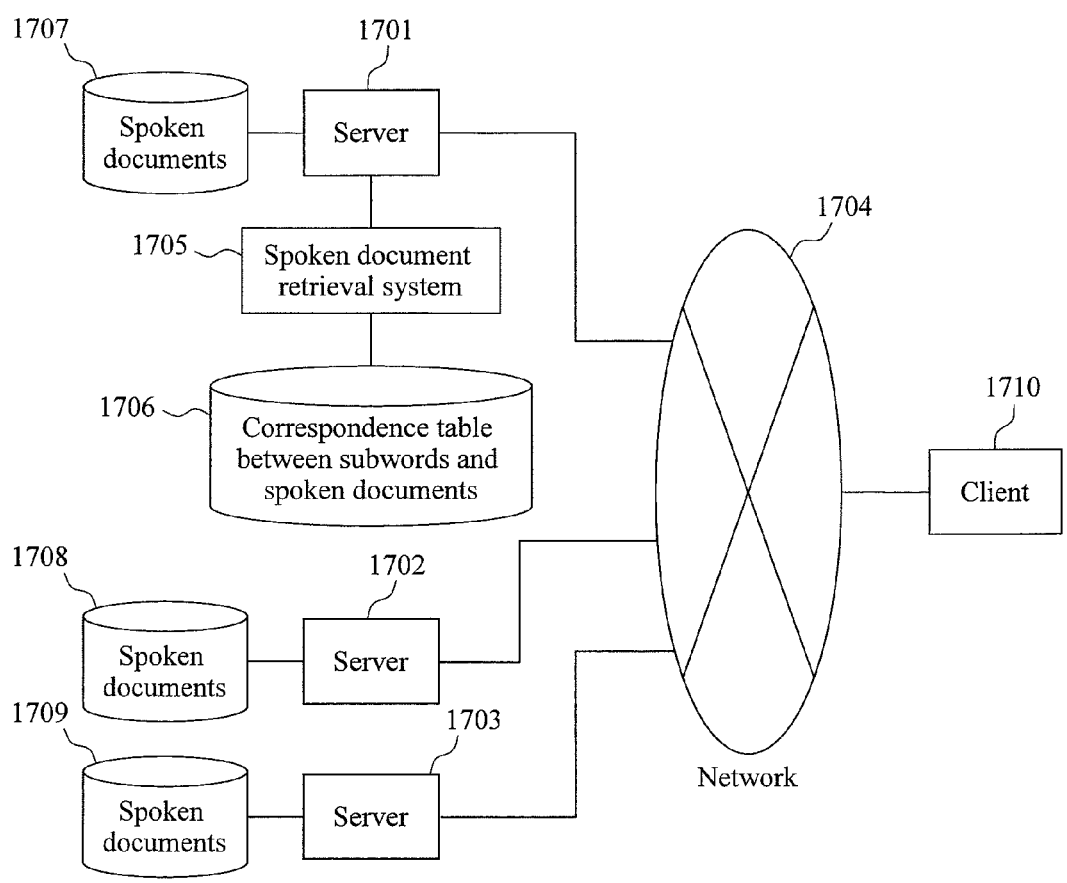
FIG. 17 is a block diagram showing an example of the configuration of a spoken document retrieval system according to a fourth embodiment of the present invention as applied thereto.

A fourth embodiment of the present invention will be described with reference to FIG. 17. The above-mentioned embodiments are described as being for the purpose of implementing the spoken document retrieval system on a stand-alone computer. In FIG. 17, the embodiment is shown as a configuration for execution of retrieval of spoken documents distributed on a network, using a spoken document retrieval system installed on the same network.

In FIG. 17, reference numerals 1701, 1702 and 1703 denote computer systems having the server function of providing various services on the network. Reference numeral 1704 denotes the network, and the servers are connected via the network. Reference numeral 1705 denotes any one of the spoken document retrieval systems shown in the conceptual block diagrams shown in FIGS. 1 and 10 or the block diagrams shown in FIGS. 2 and 11. However, the spoken document retrieval system 1705 is configured to include a communication unit for the acquisition of a keyword and the output of retrieved results via the network, in addition to any one of the configurations shown in FIGS. 1 and 10 or FIGS. 2 and 11. Also, in FIG. 17, a correspondence table between subwords and spoken documents is recorded in a divided form as designated by 1706, and, likewise, spoken documents are separately recorded as spoken documents 1707 stored in the same server as that for the spoken document retrieval system 1705, or as spoken documents 1708 and 1709 stored in other servers. In FIG. 17, reference numeral 1710 denotes a client having the function of entering the keyword from a user and transmitting the keyword to the spoken document retrieval system 1705 via the network, and also obtaining the retrieved results via the network and presenting the retrieved results to the user.

In FIG. 17, the spoken document retrieval system, in advance, executes speech recognition on the spoken documents 1707, 1708 and 1709 that are accessible via the network, and creates the correspondence table 1706 between subwords and spoken documents, using recognized results. This facilitates achieving retrieval for which the spoken documents 1707, 1708 and 1709 are targeted. If accessible spoken documents are added, processing may be performed as given below: speech recognition is executed only on the added spoken documents, position information on each subword is extracted from recognized results, and the information is added to the correspondence table between subwords and spoken documents. The correspondence table between subwords and spoken documents in the form shown in FIG. 3 is in the form in which position information items are arranged in order for each subword, and thus, the correspondence table between subwords and spoken documents adapted also for the added spoken documents can be easily constructed merely by adding newly obtained position information to the end of information on a corresponding subword.

The present invention is applicable for a hard disk recorder as technology for implementing the function of retrieving contents containing a user-specified keyword from large amounts of video contents containing speech recorded in the hard disk recorder. Also, the present invention is applicable as technology for realizing the service of retrieving contents containing a user-specified keyword from large amounts of speech contents or video contents that reside on the Internet.

EXPLANATION OF REFERENCE NUMERALS 101 spoken document
102 speech recognition part
103 correspondence table between subwords and spoken documents
104 keyword
105 part to convert a keyword to a sequence of subword
106 generation part of candidate period
107 subword count part
108 selection part of candidate period
109 output part
110 monito
111 speaker
1001 part to complement the sequence of subwords
1002 complementary rules

What is claimed is:

1. A spoken document retrieval system, comprising:
a means for storing a correspondence table between subwords and spoken documents indicative of the relationship between a subword extracted from a spoken document and the position of the subword in the spoken document;
a means for converting an entered keyword into a sequence of subwords to generate the sequence of subwords from the keyword;
a means for obtaining a position where the first subword in the sequence of subwords generated from the keyword is positioned in the spoken document, from the correspondence table between subwords and spoken documents;
a candidate period generating means for generating a candidate period starting at the obtained position of the subword and having a length of time determined by the length of the sequence of subwords generated from the keyword;
a candidate period selecting means for selecting a candidate period to be outputted as a retrieved result, based on similarity between the keyword and any one of the spoken document and the subword in the candidate period; and
a means for outputting the selected candidate period as the retrieved result.

2. The spoken document retrieval system according to claim 1, comprising a means for converting a spoken document into a sequence of subwords by extracting subwords such as phonemes, syllables or a phoneme n-gram from the spoken document, and creating the correspondence table between subwords and spoken documents on the basis of the position of the detected subword in the spoken document.

3. The spoken document retrieval system according to claim 1, comprising:

a means for storing a complementary rule in which subword replacement, insertion and deletion are recorded; and
a means for generating a complemented sequence of subwords based on the complementary rule, the complemented sequence of subwords having a candidate for a replaceable subword added thereto, for each subword in the sequence of subwords generated from the keyword,
wherein the candidate period generating means obtains the positions where all subwords that possibly appear at the beginning of the sequence of subwords generated from the keyword are positioned in the spoken document, from the correspondence table between subwords and spoken documents, by using all combinations of deletions, insertions and replacements in the complemented sequence of subwords, and determines the obtained positions as the start positions of the candidate periods.

4. The spoken document retrieval system according to claim 3, wherein
a sequence of subwords is generated using each of possible combinations of insertions, deletions and replacements in the complemented sequence of subwords,
candidate periods are generated and selected for each of the thus-generated sequence of subwords to obtain retrieved results, and
the retrieved results thus obtained are integrated to determine a final retrieved result.

5. The spoken document retrieval system according to claim 4, wherein,
at the time of integration of the retrieved results obtained from the respective sequences of subwords generated using the possible combinations of insertions, deletions and replacements in the complemented sequence of subwords, the candidate periods are assigned weights based on the number of insertions, deletions or replacements contained in the generated sequences of subwords, thereby to prioritize all the retrieved results.

6. The spoken document retrieval system according to claim 1, wherein the candidate period selecting means includes:
an adding means for selecting each of the candidate periods containing each subword in the sequence of subwords generated from the keyword, and performing an addition to a count value assigned to the selected candidate period; and
a means for prioritizing the candidate periods, on the basis of the count values of the candidate periods, and selecting a candidate period to be outputted, on the basis of the result of prioritization.

7. The spoken document retrieval system according to claim 6, wherein
the adding means for performing the addition to the count value assigned to the candidate period prepares an area in the candidate period for recording the position of each subword judged as being contained in the candidate period at the time of the addition to the count value, and, when performing another addition to the count value, the adding means compares the position of the subword judged as being contained in the candidate period with the position of the subword recorded in the candidate period, and adds a larger value to the count value if the value of the position of the subword judged as being contained in the candidate period is larger than that of the recorded position, than if the former is smaller than the latter.

8. The spoken document retrieval system according to claim 7, wherein, when another addition to the count value is performed, a value added to the count value is made different between a case where the subword judged as being contained in the candidate period is positioned within a predefined range around the position of the subword recorded in the candidate period, and a case where the subword judged as being contained in the candidate period is positioned outside the predefined range.

9. The spoken document retrieval system according to claim 6, wherein, when selecting the candidate period to be outputted, the candidate period selecting means selects the candidate period having a count value equal to or more than a threshold value determined on the basis of the length of the sequence of subwords generated from the keyword.

10. The spoken document retrieval system according to claim 6, wherein
the count value obtained by addition using a subword replaced or inserted on the basis of the complementary rule, and the count value obtained by addition using a subword other than the replaced or inserted subword are separately recorded in the candidate period, and
the candidate periods are prioritized on the basis of at least any one of the ratio of these count values, the length of the sequence of subwords, and the sum total value of the count values.

11. The spoken document retrieval system according to claim 6, wherein, if a plurality of spoken documents are present, the spoken documents are prioritized on the basis of at least any one of the count value of each of candidate periods and the number of candidate periods, the candidate periods being retrieved from each of the spoken documents.

12. The spoken document retrieval system according to claim 1, wherein the candidate period selecting means compares the sequence of subwords generated from the keyword with the sequence of subwords contained in the candidate period, using dynamic programming or the like, and selects the candidate period to be outputted, on the basis of the result of the comparison.

13. The spoken document retrieval system according to claim 1, wherein the candidate period selecting means compares an acoustic parameter generated from the keyword with an acoustic parameter extracted from the spoken document in a range corresponding to the candidate period, using a hidden Markov model (HMM), dynamic programming or the like, thereby to select the candidate period to be outputted.

\* \* \* \* \*